May 5, 1970 — C. H. DUFRESNE — 3,509,956
TRACTOR DEVICE
Filed March 7, 1968 — 4 Sheets-Sheet 1

INVENTOR.
Conrad H. Dufresne
BY
Johnson and Kline
ATTORNEYS

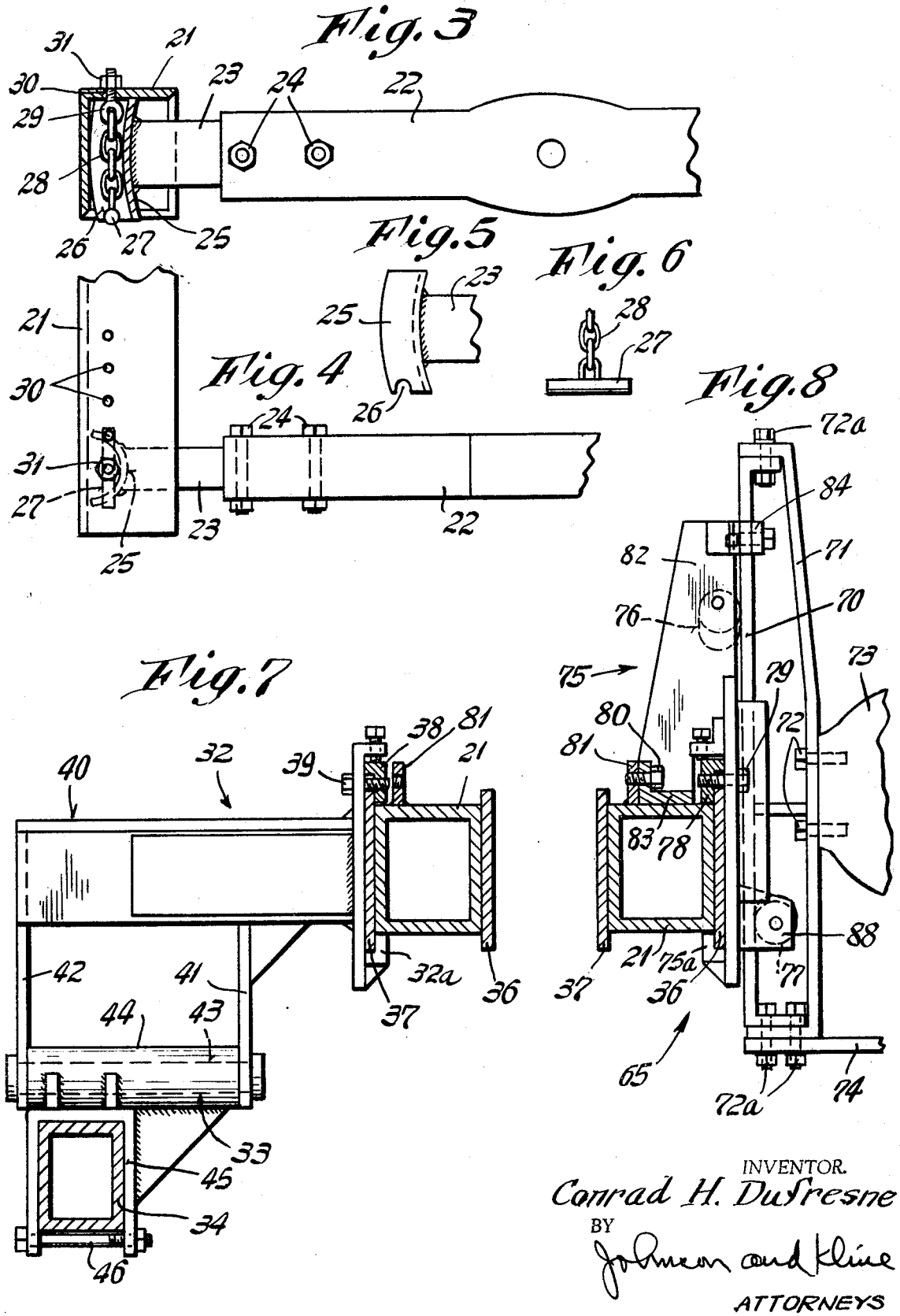

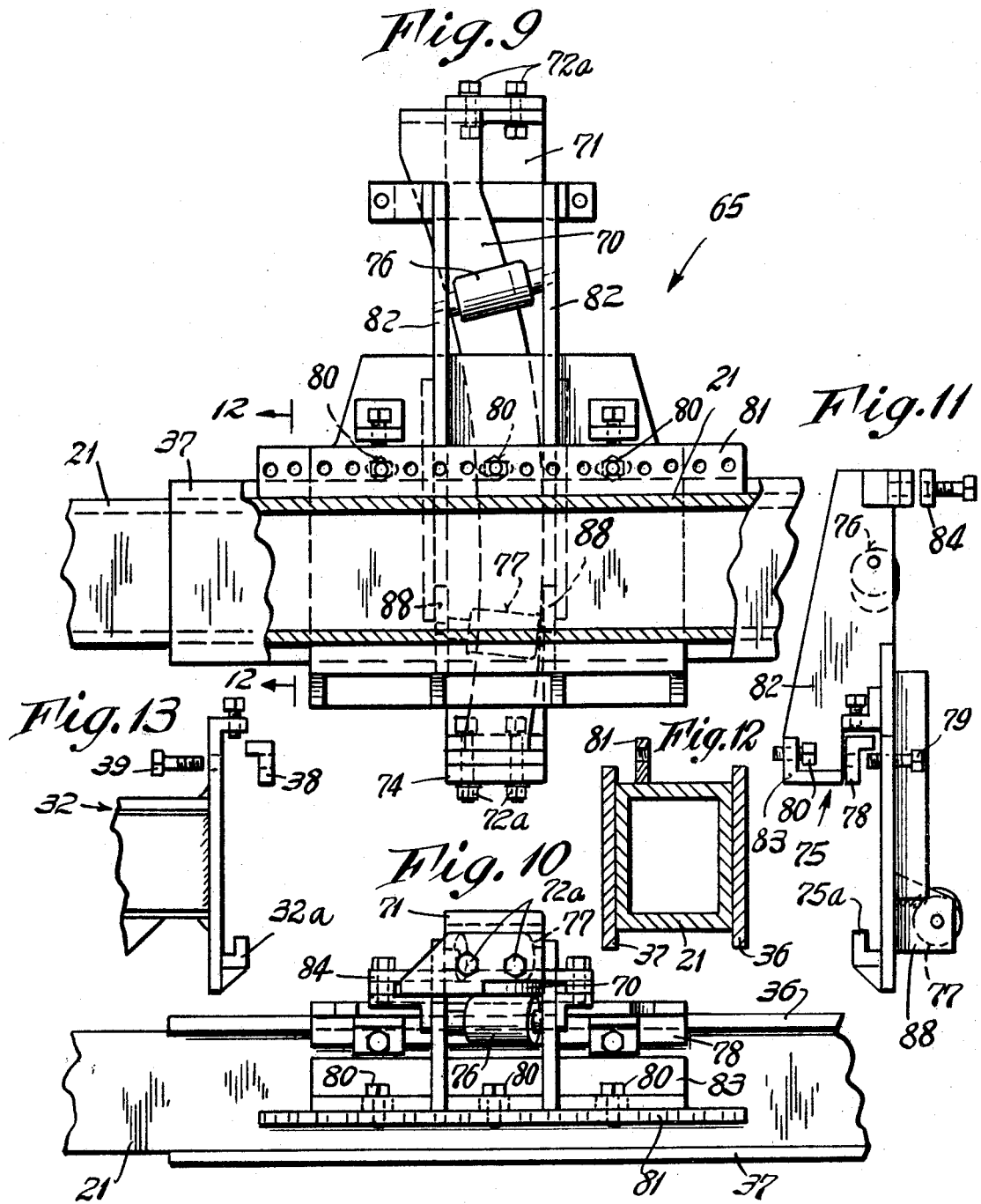

May 5, 1970  C. H. DUFRESNE  3,509,956
TRACTOR DEVICE
Filed March 7, 1968  4 Sheets-Sheet 4
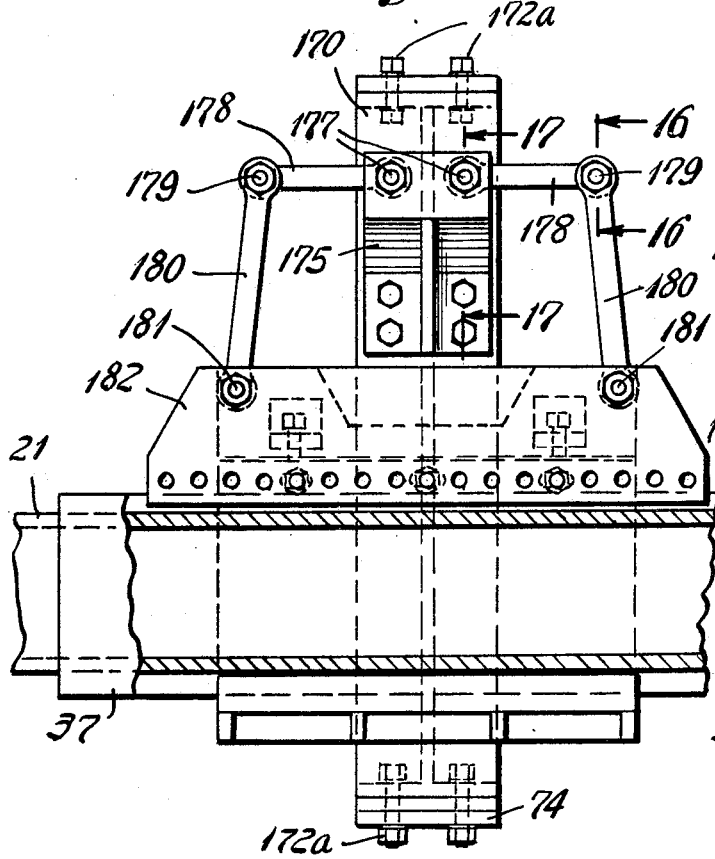
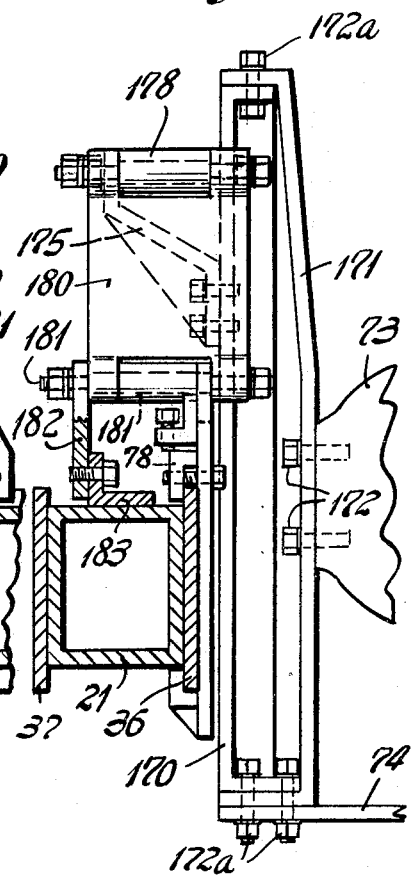
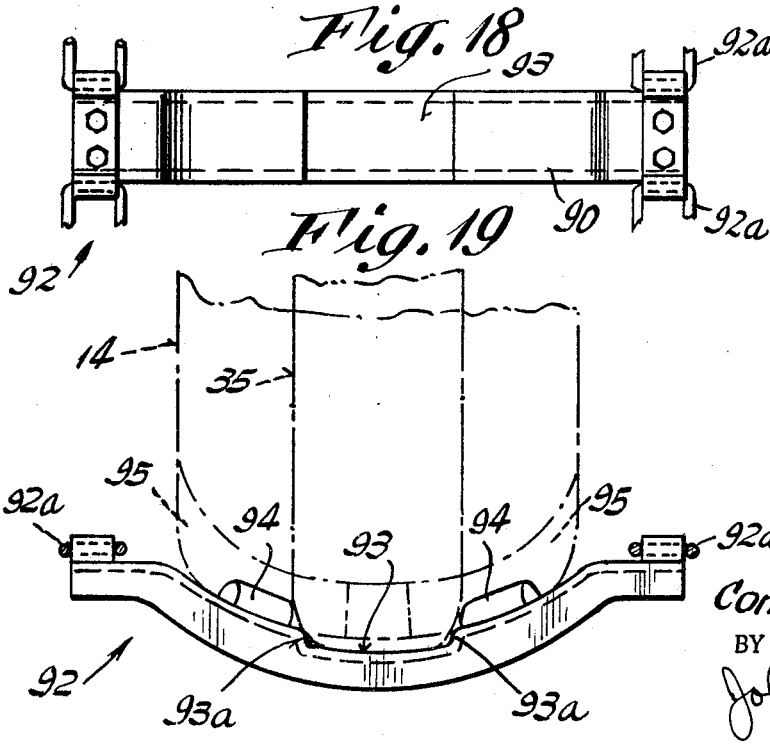
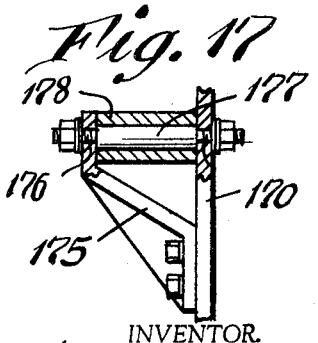
INVENTOR.
Conrad H. Dufresne
BY
Johnson and Kline
ATTORNEYS United States Patent Office 3,509,956
Patented May 5, 1970

3,509,956
TRACTOR DEVICE
Conrad H. Dufresne, Box 315,
Barre, Vt. 05641
Filed Mar. 7, 1968, Ser. No. 711,303
Int. Cl. B62d *55/04, 55/12, 55/24*
U.S. Cl. 180—9.5
12 Claims

ABSTRACT OF THE DISCLOSURE

A tractor which has been converted from a four wheel device to an endless track type in which a supporting frame which is pivoted to the rear axle housing is provided and has a construction which is readily adaptable to accommodate tractors having main frames of different lengths and widths so as to properly locate the supporting wheels in the required position. The rear supporting wheels are controlled in their movement and a stabilizing means is disposed between the main frame and supporting frame to resist torsion in the supporting frame.

Also, the treads of the endless track have a centrally disposed inner channel for cooperating with the periphery of the supporting wheels to prevent lateral movement of the treads thereon, some of the treads also having inner driving members located adjacent the sides of said channel to assist the sides of the channel in their function and at the same time provide driving means cooperating with the rear wheels to operate the endless track.

---

The present invention is an improvement on my U.S. Pat. No. 3,190,384. In that patent the supporting frame was a rigid structure fixed to the main frame and could not, because of its construction, be made to readily accommodate tractors of different sizes.

The present invention overcomes the aforementioned disadvantage by providing a construction of the supporting frame and elements carried thereby which make it universal in its application to accommodate tractors having main frames of differing lengths and widths and to locate on said supporting frame the elements carried thereby in proper location to adequately support the main frame.

A feature of the invention is the pivoting of the side members of the supporting frame to the rear axle housing and to secure the forward crossbar, which supports the front end of the main frame, with a flexible and adjustable connection to said side members.

Another feature of the invention is the ready adjustability of the rocking arms and supporting wheels carried thereby with respect to the supporting frame to properly locate said wheels to provide adequate support for the forward part of the main frame in operation.

A further feature of the invention resides in a connection between the rear supporting wheels and the rear axle housing for controlling the movement of said wheels during the operation of said tractor.

A still further feature of the invention resides in providing a stabilizing means between the supporting frame and main frame so constructed that it will counteract any torsion in the side members of the supporting frame during the operation of the tractor.

Also, novel tracks are used to further stabilize the tractor and to maintain the endless tracks in proper position during the use of said tractor and to provide adequate driving means for the endless tracks in use.

Other features and advantages of the invention will be apparent from the specification and claims when considered in connection with the accompanying drawings in which:

FIG. 3 is a front view, partly in section, of the connection between the crossbar and side member.

FIG. 4 is a top view of FIG. 3.

FIG. 5 is a detail of the end of the inner member.

FIG. 6 is a detail of the chain and cross pin.

FIG. 7 is a view, partly in section, of the pivot means.

FIG. 8 is a view, partly in section, of one form of stabilizing means.

FIG. 9 is a view, partly in section, of FIG. 8 looking from the left.

FIG. 10 is a top view of FIG. 9.

FIG. 11 is a view of the roller unit.

FIG. 12 is a sectional view taken along lines 12—12 of FIG. 9.

FIG. 13 is a partial view of the pivot bracket of FIG. 7, showing the clamping means.

FIG. 14 is a view, partly in section, of another form of stabilizing means.

FIG. 15 is an end view of FIG. 14.

FIG. 16 is a sectional view taken along line 16—16 of FIG. 14.

FIG. 17 is a sectional view taken along line 17—17 of FIG. 14.

FIG. 18 is a plan view of a tread.

FIG. 19 is a front view of another tread similar to FIG. 18 and having inner driving members.

Figures 1, 2:
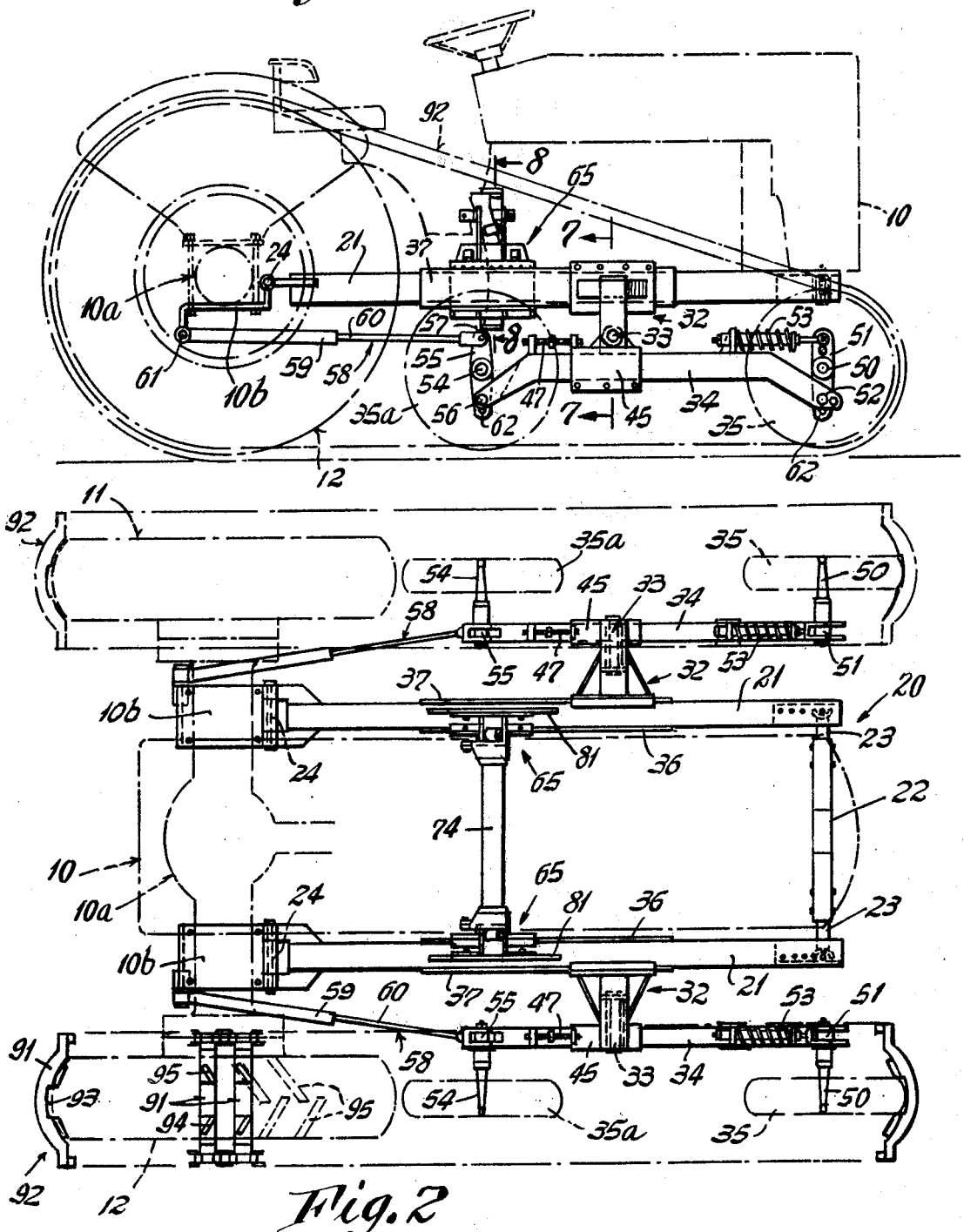
FIG. 1 is a side view of the tractor embodying the present invention with the main frame and elements carried thereby in dot-and-dash lines.
FIG. 2 is a top view of the supporting frame and elements carried thereby.

As shown in dot-and-dash lines in FIG. 1, the main frame 10 carrying the usual tractor mechanism, such as motor, steering mechanism, power transmission, clutch mechanism and the like, has its rear end supported by the rear driving wheels 11 and 12. In accordance with the present invention, the front end of the main frame is supported by a supporting frame 20. The supporting frame comprises side members 21 and a front crossbar 22. The main frame is connected to the front crossbar 22. The crossbar 22 has inner members 23 adjustably mounted at each end by bolts 24 (FIGS. 3 and 4) so as to project therefrom a desired amount to readily accommodate main frames of different widths.

The ends of the front crossbar are connected to the forward ends of the side members 21 of the supporting frame, which side members are positioned on each side of the main frame 10 and have their rear ends pivoted to brackets 10b clamped to the rear axle housing 10a. Since the mechanism on both sides of the tractor are the same, only one side will be described in detail.

In the illustrated form of the invention, the ends of the inner members 23 of the crossbar 22 are connected to the side members 21 by adjustable connections, shown in detail in FIGS. 3–6. Each end has a vertically disposed channel member 25 secured thereto. The bottom edge of the sides of the channel member 25 is notched at 26 to receive and be supported on a cross pin 27 carried on the lower end of a chain 28 as shown in FIG. 4. The upper end of the chain is secured to an eyebolt 29 passing through one of a series of holes or apertures 30 in the side members of the supporting frame and secured in position by a nut 31 threaded thereon. It will be seen by this construction that a flexible connection is provided between the side member and the crossbar and is one which can, by positioning the bolt in any of the series of holes 30, adjust the crossbar for proper position on the side member for various lengths of main frame.

As shown in FIGS. 1 and 2, the side members 21 have a bracket 32 clamped thereto intermediate the ends thereof and carrying pivot means 33 for a rocking arm 34 having mounted at the ends thereof aligned front and rear supporting wheels 35, 35a.

It will be seen in FIG. 12 that the side member 21 has inner and outer plates 36, 37 secured thereto by welding or the like to extend above the top and bottom of said side member. The bracket, as shown in FIG. 13, has clamping means to be clamped to the side member by being fastened to the outer plate 37 by a lower lip 32a and a strip 38 and clamping bolts 39 as shown in FIG. 7. With this construction the location of the bracket can be adjusted longitudinally along the side member 21 to properly locate the rocking arm and the wheels 35, 35a carried thereby with respect to the main frame of tractors of different lengths.

The bracket 32 has a projecting portion 40 carrying the pivot means 33 comprising a pair of spaced dependent plates 41, 42 carrying a pivot pin 43. A sleeve 44 surrounds the pivot pin 43 and has secured thereto by welding or the like a downwardly facing U-shaped channel 45 to receive the rocking arm 34. The rocking arm is held therein by clamping bolts 46, as shown in FIG. 7. By releasing the bolts, the rocking arm can be adjusted longitudinally with respect to the bracket to obtain a finer adjustment for the wheel location. If desired, an adjusting screw 47 (FIGS. 1 and 2) connecting the bracket and rocking arm can be provided.

In accordance with the present invention as illustrated in FIGS. 1 and 2, an axle 50 for the forward supporting wheel 35 is carried or mounted intermediate the ends of a lever 51. The lever has its lower end pivoted at 42 to the rocking arm and its upper end connected to a tensioning spring unit 53 carried by the rocking arm to resiliently hold the wheel in its proper position. The axle 54 for the rear supporting wheel 35a is mounted on a second lever 55 having its lower end pivoted at 56 to the rocking arm and its upper end 57 connected to a tie rod 58 comprising a pair of adjustable telescopic members 59, 60 having the other end connected by a pivot 61 to the bracket 10b on the axle housing 10a so as to control the movement of the rear supporting wheel 35a during the movement of the tractor over uneven ground. It will be noted that the portions of the levers adjacent each end of the rocking arm include a plurality of apertures 62 whereby desired adjustments of the position of the lever with respect to the rocking arm can be achieved.

To counteract any torsion as might be set up in the side members of the supporting frame due to the supporting wheels moving over uneven ground, or in the steering of the tractor by means of the tracks, stabilizing means 65 is provided between the side members 21 and the main frame 10. Since the mechanism of this means is the same for both sides of the tractor, only one will be described in detail.

In the form of the invention shown in FIGS. 8-12, a stabilizing plate 70, preferably curved as shown in FIG. 9, is secured in position on the main frame by mounting means 71 connected by bolts 72, 72a to a clutch housing 73 and a tie bar 74 on the main frame (FIG. 8). A cooperating roller unit 75 shown in FIG. 11 has a pair of spaced rollers 76 and 77, one adjacent each end carried by plates 82 and bracket 88 and a guide 84.

This unit is clamped to the plate 36 by a lower lip 75a and a clamping strip 78 and bolts 79 and further held in position by bolts 80, carried by bracket 75b of unit 75, threaded in the threaded holes in a flange 81 secured to the top of the side member 21 and passing through bracket 83a on the frame as shown in FIG. 8. When assembled in this position, the rollers 76, 77 engage opposite sides of the stabilizing plate 70 and will cooperate with said plate to resist any torsion in the side member as it moves up and down during the movement of the tractor over uneven ground or for any other reason.

In the form of the invention shown in FIGS. 14-17, a stabilizing plate 170 is secured in position on the main frame 10 by mounting means 171 connected by bolts 172, 172a to the clutch housing 73 and the tie bar 74 of the main frame. The stabilizing plate has a bracket 175 secured thereto so as to provide bearings 176 for a pair of pivot pins 177 for pivotally mounting one end of a pair of first stabilizing arms 178. This is shown in detail in FIG. 17. The other ends of said first stabilizing arms 178 are connected by pivots 179 carried in the upper end of a second pair of stabilizing arms 180 as shown in detail in FIG. 16. The lower ends of said second stabilizing arms 180 are mounted on pivot pins 181 carried by a plate 182, which plate is secured to a flange 183 on the side member 21. The stabilizing arms are so located, as shown in FIG. 14, that they will counteract any torque occurring in said side members 21.

To further improve the stability of the tractor of the present invention, the treads 90, 91 of the endless tracks 92, which are connected by links 92a, extend around the rear wheels and the supporting wheels, as shown in FIG. 1. These tracks are constructed as shown in FIGS. 18 and 19 with an inner channel 93, preferably centrally disposed, having a width to receive the peripheral portions of the supporting wheels 35, 35a. It will be noted that the walls 93a of the channel will engage the sides of the wheel and prevent the track from moving laterally with respect to the wheels so as to produce an inadvertently thrown track. Some of the treads will be provided with inner driving members 94 which are disposed, as shown in FIG. 19, adjacent each side of the channel 93. These members will cooperate with the projecting cleats 95 on the rear wheels, which are shown as being substantially wider than the supporting wheels, for driving the track and will also aid the channels in holding the tracks on the supporting wheels since they will engage the side walls of the supporting wheels and increase the effectiveness of the walls 93a of the channel in maintaining the track in position on the wheels.

Variations and modifications may be made within the scope of the claim and portions of the improvements may be used without others.

I claim:

1. In a tractor having a main frame supported on a pair of rear driving wheels, a supporting frame for supporting the front end of the main frame and having rocking arms pivoted thereto by pivot means, said rocking arms carrying forward and rear supporting wheels at each end and on each side of the tractor, and an endless track extending around the rear wheel and forward and rear supporting wheels on each side of the tractor, the improvement wherein said supporting frame comprises; rigid, unitary side members of rectangular cross-section extending along the side of said main frame and having their rear ends pivotally connected to an axle housing for said rear wheels and having a crossbar extending between the forward ends of said side members and releasable means for connecting said crossbar to the forward ends of said side members at a plurality of longitudinally spaced portions along the side members, the forward end of said main frame being pivotally connected to and supported upon said crossbar.

2. The invention as defined in claim 1 wherein the crossbar is rectangular in cross-section and has inner members adjustably mounted therein to accommodate main frames of different widths, with the free ends of said inner members being connected by a flexible connection to said side members.

3. The invention as defined in claim 2 wherein said flexible connection comprises a vertical channel secured to the end of the inner member and having aligned notches in its bottom end, a chain having an eyebolt at its upper end connected to the side member and having a cross pin at its bottom disposed in the notches to support the crossbar thereon.

4. The invention as defined in claim 3 wherein the forward portion of the side frame has a plurality of longitudinally disposed spaced apertures to receive the eyebolt to properly locate the crossbar to accommodate main frames of different lengths.

5. The invention as defined in claim 1 wherein the pivot means for the rocking arm comprises a bracket clamped to the side member and adjustable therealong to locate the supporting wheels in proper position for main frames of different lengths.

6. The invention as defined in claim 1 wherein the pivot means includes a pivot pin, a channel-shaped member carried by the pivot pin receiving said rocking arm and having means for clamping said arm therein, said rocking arm being adjustable longitudinally in said channel to vary the pivotal relation between said supporting wheels and said main frame.

7. The invention as defined in claim 1 wherein there is an adjustable tie rod having one end connected to a mounting means for the rear supporting wheel and the other end pivotally connected to said axle housing for the rear wheel to control the movement of said rear supporting wheel by the pivoting rocking arm.

8. The invention as defined in claim 1 wherein a stabilizing means is disposed between each of said side members and said main frame to counteract any torsion in said side members incident to the operation of said tractor.

9. The invention as defined in claim 8 wherein the stabilizing means comprises a stabilizing plate fixedly secured to the main frame and a bracket secured to the side member and having spaced rollers engaging both sides of the stabilizing plate to counteract any torsion in the side member during operation of the tractor.

10. The invention as defined in claim 8 wherein the stabilizing means comprises a stabilizing plate fixed to said main frame, a bracket secured to the side member, and a pair of oppositely disposed articulated links, each having one of its ends pivotally connected to said stabilizing plate and to said bracket to counteract any torsion in the side member during operation of the tractor.

11. The invention as defined in claim 1 wherein the endless track comprises a plurality of treads linked together, each having an interior central channel having a width to receive the peripheral portions of said supporting wheels with the sides of the channel engaging the sides of the wheels to prevent lateral relative movement of the treads on said wheels to stabilize the tractor during operation thereof.

12. The invention as defined in claim 11 wherein some of said treads also have driving members on the inner surface thereof to cooperate with the rear wheels to drive the tracks, said driving members being located adjacent the side walls of said central channels to engage the sides of said supporting wheels and assist said channels in preventing lateral movement of the treads on said wheels.

References Cited

UNITED STATES PATENTS

| 1,383,356 | 7/1921 | Weir | 305—32 |
| 2,702,211 | 2/1955 | Arps | 305—32 |
| 2,891,821 | 6/1959 | Mayr | 180—9.58 |
| 3,142,352 | 7/1964 | Johansson | 180—22 |
| 3,190,384 | 6/1965 | Dufresne | 180—9.5 X |
| 3,343,889 | 9/1967 | Bexten | 305—32 X |

FOREIGN PATENTS

| 477,866 | 1/1938 | Great Britain. |
| 758,938 | 10/1956 | Great Britain. |

RICHARD J. JOHNSON, Primary Examiner

U.S. Cl. X.R.

305—56